United States Patent Office 3,506,626
Patented Apr. 14, 1970

3,506,626
PREPARATION OF ORGANIC SULFUR POLYMERS
Paul F. Warner, Phillips, Tex., and Merlin E. Bentley, Bartlesville, Okla., assignors to Phillips Petroleum Company, a corporation of Delaware
No Drawing. Continuation-in-part of application Ser. No. 593,300, Nov. 10, 1966. This application May 12, 1967, Ser. No. 637,919
Int. Cl. C08g 23/00
U.S. Cl. 260—79                                                   1 Claim

ABSTRACT OF THE DISCLOSURE

Thiol-terminated polymers are formed by contacting at least one diolefin with at least one cycloaliphatic dimercaptan in the presence of a catalyst. Suitable catalysts include hydrogen peroxide, organic peroxides, organic hydroperoxides and azo nitriles.

---

This application is a continuation-in-part of our copending application Ser. No. 593,300 filed Nov. 10, 1966, now abandoned.

This invention relates to the production of sulfur-containing organic polymers. In one aspect, it relates to the production of thiol-containing polymers. In another aspect, it relates to the use of hydrogen peroxide, organic peroxides, including hydroperoxides, and azo nitriles as catalysts for the reaction of diolefins and cycloaliphatic dimercaptans. In still another aspect, it relates to a method for the production of thiol-terminated polymers by reacting diolefins and cycloaliphatic dimercaptans in the presence of a peroxide or azo nitrile catalyst. In still another aspect, it relates to polymeric compounds having an average of approximately two thiol groups per molecule formed by the catalytic reaction of cycloaliphatic dimercaptans and diolefins in the absence of ultraviolet light. In another aspect, it relates to the production of polymers of constant molecular weight but variable viscosity by reacting a cycloaliphatic dimercaptan with a mixture of diolefins. In another aspect, it relates to the production of polymers from unpurified cycloaliphatic dimercaptans using a peroxide or hydroperoxide catalyst or an azo nitrile catalyst in conjunction with triphenylphosphite. In still another aspect, it relates to the production of cross-linked polymers by the addition of small quantities of polybutadiene to the reaction of cycloaliphatic dimercaptan with diolefins.

It has been proposed to make polymers by reaction of various dimercaptans with diolefins. Prior to our invention, however, it has not been known that a useful polymer could be formed from a cycloaliphatic dimercaptan. Nor has it been proposed that polymers of constant molecular weight but variable viscosity could be prepared by reacting a dimercaptan with a variable mixture of diolefins. It furthermore has not been known that a low cost thiol-terminated polymer could be obtained by use of an unpurified dimercaptan. It has further not been known that polymers having thiol functionality of about 2 could be produced from cycloaliphatic dimercaptans.

It is therefore an object of our invention to react cycloaliphatic dimercaptans with diolefins to form polymeric thiol-containing compounds. It is a still further object of our invention to produce a high thiol content polymer by the reaction of a cycloaliphatic dimercaptan and a diolefin. It is a still further object of our invention to produce a high thiol content polymer from a cyclic diolefin and a cycloaliphatic dimercaptan. It is a still further object of our invention to produce a thiol-terminated polymer having a thiol functionality of about 2. It is a further object of our invention to produce a polymer from an impure dimercaptan. It is a further object to produce polymers of constant molecular weight but variable viscosity. It is yet a further object to produce a cross-linked thiol-containing polymer.

Other aspects, objects, and the several advantages of this invention are apparent to one skilled in the art from a study of this disclosure, and the appended claim.

According to the invention, polymers are formed by contacting a diolefin and a cycloaliphatic dimercaptan in the presence of a catalyst which is either hydrogen peroxide, an organic peroxide, including hydroperoxides, or an azo nitrile.

The olefinic compounds which can be reacted according to the process of our invention can have from 4 to 20 carbon atoms per molecule, and two or more points of olefinic unsaturation. Examples of such compounds are: butadiene-1,3, pentadiene-1,3, pentadiene-1,4, hexadiene-1,5, hexadiene-1,4, heptadienes, octadienes, vinylcyclohexene, etc. The above compounds, and their various homologs, may be substituted in the nucleus and/or in the substituents in various degrees by aliphatic, cyclic, and/or heterocyclic radicals, and by such substituents as alkoxy, alkenoxy, aralkoxy, alkylimido, etc.

The mercaptans suitable for use in the process of this invention are compounds having the formula HSRSH wherein R is a substituted or unsubstituted saturated cycloaliphatic radical.

Examples of suitable mercaptans are: cyclopentane dithiol, cyclohexane dithiol, cyclooctane dithiol, β-mercaptoethyl cyclohexane thiol, and like compounds, as well as their homologs, analogs, and substituted products. A particularly suitable material is the dimercaptan mixture prepared by the reaction of hydrogen sulfide on 4-vinylcyclohexene-1 in the presence of ultraviolet light, and comprising a mixture of β-mercaptoethyl cyclohexane thiol-3 and β-mercaptoethyl cyclohexane thiol-4. For convenience, this mixture of mercaptans is referred to herein as ethylcyclohexyl dimercaptan.

The catalysts suitable for use in our invention are chosen from hydrogen peroxide, organic peroxides, including hydroperoxides, and azo nitrile compounds.

The peroxides suitable for use have the formula R′OOR′, wherein each R′ is hydrogen, alkyl, aralkyl, alkaryl, cycloalkyl, aroyl, acyl, alkynyl, or aryl radical. These radicals may each contain from 1 to 20, inclusive, preferably not more than 10, carbon atoms. Examples of peroxides which can be used include hydrogen peroxide, methyl hydroperoxide, isopropyl hydroperoxide, tert-butyl hydroperoxide, cyclohexyl hydroperoxide, α,α-dimethyl-p-isopropylbenzyl hydroperoxide, dimethyl peroxide, di-n-propyl peroxide, di-tert-butyl peroxide, methyl ethyl peroxide, 3-methyl-3-hydroperoxy-1-butyne, 2-methyl-3-butynyl hydroperoxide, bis(2-methyl-3-butynyl) peroxide, dibenzoyl peroxide, diacetyl peroxide, dipropionyl peroxide, α,α-dinaphthyl peroxide, peroxyformic acid, peroxyacetic peroxybutyric acid, peroxybenzoic acid, peroxycinnamic acid, diperoxyterephthalic acid, and the like.

The azo nitrile compounds suitable for use as catalysts have the formula

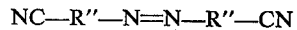

NC—R″—N=N—R″—CN wherein each R″ is an alkylene or substituted alkylene group. Substituents on the alkylene group can be aryl, cycloalkyl, carboxy, or other. Each R″ preferably contains from 4 to 20 carbon atoms.

Of the azo nitrile compounds which are suitable for use as catalysts in our invention, the symmetrical compounds having each of the azo nitrogens attached to a carbon atom to which are attached three other carbon atoms are preferred. Examples of these compounds include α,α′-azodiisobutyronitrile
α,α′-azobis-(α,γ-dimethylvaleronitrile)
α,α′-azobis(α-methylenanthonitrile)
α,α′-azobis-(α-ethylbutyronitrile)
α,α′-azobis-(α-phenylpropionitrile)
α,α′-azobis(α-cyclopropylpropionitrile)
α,α′-azobis(α-cyclohexylpropionitrile)
α,α′-azobis(α-cycloheptylpropionitrile)
α,α′-azobis(α-isopropyl-β-methylbutyronitrile)
α,α′-azobis(α,γ-dimethylcapronitrile)
α,α′-azobis(α-n-butylcapronitrile)
α,α′-azobis(α-isobutyl-γ-methylvaleronitrile)
α,α′-azobis(α-methyl-γ-carboxy-butyronitrile)

and the corresponding salts such as the sodium salts of the following carboxy-substituted nitriles:

1,1′-azodicyclohexanecarbonitrile
1,1′-azodicycloheptanecarbonitrile
1,1′-azobis(3-methylcyclopentanecarbonitrile)
1,1′-azobis(2,4-dimethylcyclohexanecarbonitrile)

Conditions under which the reaction takes place will vary dependent upon the actual materials being reacted, the precise catalyst used, and the desired rate of reaction. Temperatures will be in the range of room temperature to 350° F., preferably between 120° F. and 300° F. Generally, higher temperatures are required with the peroxide catalysts than with the azo nitrile catalysts, for example, between 200° F. and 300° F. Pressure in the reaction chamber is not critical, and will normally be between atmospheric and 100 pounds/square inch. While it is contemplated that reactions according to the invention will be conducted in the absence of actinic radiation, it is within the scope of our invention to use ultraviolet or other radiation in addition to the catalysts.

The concentration of the catalyst in the reaction mixture, and the conditions under which the reaction takes place will vary dependent upon the actual materials being reacted. As there is a considerable difference in the reactivity of the various compounds mentioned, it will be necessary to determine by routine experimentation the particular reaction conditions for each particular starting material combination. In general, the concentration of the catalyst in the reaction mixture will range from 1 to 5 percent by weight of the reactants.

It is within the scope of this invention to react the cycloaliphatic dimercaptan with mixtures of diolefins to obtain products with specifically desired properties. Specifically, it is possible to vary the viscosity of a polymer while maintaining a constant molecular weight by varying the ratio of 2 diolefins in the reaction mixture. The ratio of dimercaptan to diolefin can be varied to obtain polymers with desired characteristics. Generally, an excess of the dimercaptan is used in forming these polymers and the molecular weight of the polymer can be controlled by the amount of excess dimercaptan added to the reaction mixture. If an excess of olefin is present in the reaction mixture, an olefin-terminated polymer will be obtained.

It is within the scope of this invention to produce polymers having additional cross-linking by using at least a portion of a triolefin or trimercaptan in the reaction mixture.

It is also within the scope of this invention to produce a cross-linked polymer by incorporating a small quantity of polybutadiene as a cross-linking agent in the reaction of the diolefin with the cycloaliphatic dimercaptan. In this embodiment of the invention, liquid polybutadiene having a molecular weight of about 750 to about 3000, preferably about 1200, is employed. The quantity of polybutadiene employed will vary depending upon the molecular weight, but generally quantities below 5% are desirable. Higher quantities will cause gelation of the polymer, making it unsuitable for use in calking formulations.

Preferred polymers prepared within the scope of this invention are those formed by the reaction of 4-vinylcyclohexene-1 with ethylcyclohexyl dimercaptan prepared as discussed above. In preparing this dimercaptan in the presence of ultraviolet light, some unreacted 4-vinylcyclohexene-1 will remain in the reaction mixture. It is within the scope of this invention to add the catalysts of this invention to the reaction mixture containing 4-vinylcyclohexene-1 and ethylcyclohexyl dimercaptan in order to form a polymer between these two materials.

It has been found that polymers made using the catalysts of this invention have a higher thiol content than equivalent polymers made by reactions induced by ultraviolet reaction alone. The thiol functionality of our polymers is in the range of 1.6 to 2.0, preferably 1.8 to 2.0. Because of this higher thiol content, the polymers formed by the process of this invention are particularly valuable for use in calking compounds and as curing agents for epoxy resins. The polymers formed by the process of this invention, as well as some of the non-polymeric compounds formed by the process of this invention, are useful as modifiers for synthetic rubbers, and as intermediates for the preparation of various sulfur-containing derivatives. Some of the compounds also find utility as insect repellents. Olefin terminated polymers formed by the process of this invention can be further polymerized to give high molecular weight sulfur-containing polymers.

EXAMPLE I

In a series of runs, ethylcyclohexyl dimercaptan was reacted with 4-vinylcyclohexene-1 in the presence of azobis-isobutyronitrile catalyst. These runs were conducted in a benzene diluent medium in a glass reactor. The progress of the reaction was followed by periodic mercaptan sulfur analysis. When the reaction was complete, as indicated by lack of further mercaptan sulfur depletion, the crude was transferred to a rotary evaporator and flash-distilled at 0.5 mm. Hg absolute pressure and 300° F. The polymer remaining in the flask was analyzed to determine molecular weight, mercaptan sulfur and total sulfur contents, viscosity and specific gravity. All of the polymers so prepared were golden yellow in color and had specific gravities between 1.05 and 1.10. Properties of the polymers so produced are shown in the table below, which shows the ratio of ethylcyclohexyl dimercaptan (ECHDM) to vinylcyclohexene (VCH), catalyst used and reaction conditions for producing the polymers.

TABLE 1

| | Catalyst [1] | | Reaction temperature, °F. | Reaction time, hours | Properties of Polymer | | | | |
|---|---|---|---|---|---|---|---|---|---|
| | Type | Level wt., percent | | | Mole wt. | Mercaptan sulfur, wt., percent | Thiol functionality | Total sulfur | Viscosity poise at 77° F. |
| ECHDM/VCH: | | | | | | | | | |
| 2/1 | AIBN | 1.1 | 150–180 | 21 | 657 | 10.2 | 2.1 | 19.8 | 110 |
| 3/2 | AIBN | 0.5 | 150–180 | 17 | 944 | 6.7 | 2.0 | | 1,676 |
| 4/3 | AIBN | 1.0 | 150–180 | 30 | 867 | 7.4 | 2.0 | 23.1 | 1,028 |
| 4/3 | AIBN | 0.4 | 150–180 | 13 | 980 | 6.8 | 2.1 | 19.7 | 2,752 |
| 6/5 | AIBN | 1.0 | 150–180 | 32 | 1,233 | 5.4 | 2.0 | 23.2 | 4,800 |

[1] AIBN is azodisisobutyronitrile; level based on total monomers charged.

EXAMPLE II

Two runs were made, reacting 4-vinylcyclohexene-1 with ethylcyclohexyl dimercaptan in the presence of 5 percent ditertiary butyl peroxide, with varying mole ratios of the two reactants. Reaction temperature was maintained at 300° F. Properties of the polymers formed at the varying mole ratios are shown in the table below:

TABLE II

| | | |
|---|---|---|
| Mole ratio, ECHDM/VCH | 2/1 | 3.1/1 |
| Reaction time, minutes | 20 | 60 |
| Mole weight of polymer | 417 | 493 |
| Mercaptan sulfur, wt. percent | 14.3 | 11.82 |
| Thiol units/molecule | 1.9 | 1.8 |
| Total sulfur, wt. percent | 23.8 | 25.8 |
| Viscosity at 77° F., cps | 1,800 | 3,400 |

EXAMPLE III

A series of polymers having varying viscosity but substantially equal molecular weight was formed by reacting ethylcyclohexyl dimercaptan with mixtures of 4-vinylcyclohexene-1 and 1,7-octadiene. The polymers were prepared by reacting monomers at 130 to 180° F., in a 1-liter glass reactor with 20 to 30 weight percent of benzene diluent with approximately 0.75 weight percent of $\alpha,\alpha'$-azobisisobutyronitrile catalyst. After the reaction was complete, the solvent, unreacted monomers and catalyst residue were flashed off in a rotary flash unit at 0.5 mm. Hg and 300° F. Properties of the polymers formed are shown in the table below.

EXAMPLE IV

Ethylcyclohexyl dimercaptan is formed by ultraviolet irradiation of 4-vinylcyclohexene-1 and hydrogen sulfide in a glass reactor. The crude product had the following analysis:

| | Weight percent |
|---|---|
| Vinylcyclohexene | 4.87 |
| Monothiols | 35.62 |
| Dithiols | 41.07 |
| Heavies | 16.60 |
| Unidentified | 1.84 |
| Total | 100.00 |

This crude reactor product was charged to a reactor along with 0.5 weight percent ditertiarybutyl peroxide and heated to 250–300° F. Additional peroxide was added as needed to keep the reaction going. Samples were withdrawn at frequent intervals and analyzed. When the reaction appeared complete, the product was removed and flashed. The product consisted of 71.3 weight percent of the charge to the reactor, and had the following properties:

| | |
|---|---|
| Mole weight | 511 |
| Mercaptan sulfur, wt. percent | 10.2 |
| Functionality | 1.6 |

EXAMPLE V

The crude reactor product of Example IV was charged to a reactor with the addition of 3 volume percent vinyl-

TABLE III

| Moles, dimercaptan | Moles 4-vinyl-cyclo-hexene-1 | Moles, 1,7-octa-diene | Molecular weight | Mercaptan sulfur, wt. percent | Thiol units/ Molecule | Total sulfur, wt. percent | Viscosity at 77° F., cps. |
|---|---|---|---|---|---|---|---|
| 4 | 3 | 0 | 980 | 6.77 | 2.07 | 19.7 | 275,200 |
| 4 | 2 | 1 | 915 | 6.92 | 1.96 | 22.9 | 35,000 |
| 4 | 1 | 2 | 958 | 5.85 | 1.75 | 22.6 | 15,200 |
| 4 | 0 | 3 | 975 | 6.53 | 1.99 | 22.1 | 5,200 |

From the table above, it is seen that a polymer can be prepared from ethylcyclohexyl dimercaptan having substantially constant molecular weight, but a viscosity as desired in the range of 5,200 cps. to 275,200 cps. The ability to thus vary the viscosity for a given molecular weight polymer makes this invention of great value to formulators who may use the polymers in applications ranging from very thin coating compounds to extremely heavy knife grade calking compounds.

Further, in accordance with this invention, it has been discovered that unpurified cycloaliphatic dimercaptans can be used to make thiol-terminated polymers. As stated above, ethylcyclohexyl dimercaptan is produced by the ultraviolet reaction of 4-vinylcyclohexene-1 and hydrogen sulfide. Since this reaction is not generally carried to completion, the reaction mixture as obtained in plant operations consists of a mixture of unreacted vinylcyclohexene, mono-thiols, di-thiols, and heavy materials. We have discovered that this crude reaction mixture can be flashed to remove hydrogen sulfide, and then further reacted in the presence of an azo nitrile or peroxide catalyst to give polymers which are substantially equivalent to those produced using purified materials.

cyclohexene. Catalyst concentration and reaction time and conditions were as described in the previous example. The yield of polymer was 74.8 weight percent, and properties of the polymer were as follows:

| | |
|---|---|
| Mole weight | 668 |
| Mercaptan sulfur | 7.9 |
| Functionality | 1.6 |

As shown in the above two examples, the peroxide catalysts are capable of promoting reaction between the crude vinylcyclohexene and ethylcyclohexyl dimercaptan. However, the azo nitrile catalysts do not promote this reaction, presumably because of the presence of some free sulfur in the reaction mixture which inhibits the catalytic action of the azo nitrile. It has further been discovered in accordance with this invention, however, that if triphenylphosphite is added to the reaction mixture, an azo nitrile catalyst will cause reaction of a crude ethylcyclohexyl dimercaptan product with vinylcyclohexene. The triphenylphosphite should be present at a level of approximately 2 volume percent of the mixture. Since triphoenylphosphite can be used to promote the synthesis of the dimercaptan, it is possible to rely upon its presence in the crude in order to allow use of the azo nitrile catalyst.

EXAMPLE VI

A crude reactor product containing triphenylphosphite was obtained having the following composition:

| | Weight percent |
|---|---|
| Vinylcyclohexene | 5.67 |
| Monothiols | 23.49 |
| Dithiols | 45.30 |
| Heavies | 20.75 |

Three runs were conducted using this crude and azoisobutyronitrile catalyst. The first of the runs in the table below was on crude itself, and the two subsequent runs contained additional amounts of vinylcyclohexene. Properties of the polymer were as follows:

TABLE IV

| Catalyst | Catalyst level, wt. percent | VCH added, wt. percent | Reaction temp., °F. | Reaction time, hours | Yield of polymer, wt. percent | Mole wt. | Mercaptan sulfur, wt. percent | Functionality |
|---|---|---|---|---|---|---|---|---|
| AIBN | 1.6 | None | 200–260 | 7 | 69 | 483 | 12.2 | 1.8 |
| AIBN | 1.5 | 8.3 | 180–200 | 19 | | 653 | 8.9 | 1.8 |
| AIBN | 1.2 | 18.1 | 190–205 | 16 | 84.5 | 683 | 6.7 | 1.4 |

EXAMPLE VII

Cross-linked polymers are produced by incorporating a small quantity of polybutadiene into the reaction of ethylcyclohexyl dimercaptan with vinylcyclohexene. The reactants were charged to a stirred flask along with AIBN catalyst, and polymerization was continued until analysis showed little or no change in the mercaptan sulfur content. Unreacted mercaptan and diolefin were flashed at 300° F. and about 1.0 mm. Hg absolute pressure using a rotary evaporator and an oil bath. Properties of the polymers so produced are shown in Table V.

TABLE V

| Mole ratio, ECHDM/VCH | 2/1 | 2/1 | 2/1 | 2/1 |
|---|---|---|---|---|
| Polybutadiene modifier,[1] wt. percent | 0 | 2 | 3 | 4 |
| Reaction temperature, °F [2] | 130–253 | 150–246 | 150–156 | 150–218 |
| AIBN used, wt. percent | 0.14 | 0.76 | 0.64 | 0.63 |
| Reaction time, hours | 19 | 21 | 14 | 18 |
| Polymer yield, wt. percent | 81.7 | 84.2 | 89.5 | |
| Properties of Polymer: | | | | |
| Mole weight | 668 | 827 | 728 | |
| Total sulfur, wt. percent | 20.0 | 25.03 | 19.22 | |
| Mercaptan sulfur, wt. percent | 9.28 | 8.13 | 8.88 | 9.58 |
| Viscosity, poise at 77° F | 118 | 1,106 | 2,668 | Gelled |
| Thiol functionality | 1.93 | 2.10 | 2.01 | |

[1] Molecular weight 1,200.
[2] The first figure was the set synthesis temperature. The second figure represents the highest temperature reached during the exotherm on addition of the first increment of AIBN.

EXAMPLE VIII

Samples produced according to Example VII were cured with lead peroxide. Properties of the cured polymers are shown in Table VI.

TABLE VI

| Polybutadiene content, wt. percent | 0 | 2 | 3 |
|---|---|---|---|
| Tensile strength, p.s.i | 64 | 101 | 286 |
| Elongation, percent | <50 | <50 | <50 |

EXAMPLE IX

Samples of polymers produced by Example VII were cured with a sulfurzinc oxide cure system which is disclosed in copending application Ser. No. 578,517 filed Sept. 12, 1966. The polymers and curing agents were mixed and transferred to an aluminum dish for a weekend cure at room temperature. Following this, they were heated at 140° F. for an additional week. Recipes of the polymers are shown in Table VII.

TABLE VII

| Polybutadiene in polymer, wt. percent | 0 | 2 | 3 | 3 |
|---|---|---|---|---|
| Polymer mercaptan sulfur | 9.28 | 8.13 | 8.88 | 8.88 |
| Recipe: | | | | |
| Polymer used, g | 10 | 10 | 10 | 10 |
| ZnO-sulfur mix [1] | 2.3 | 2.05 | 2.22 | 2.22 |
| Catalyst [2] | 0.5 | 0.5 | 0.5 | 0.5 |
| Dibutyl phthalate [3] | | | 2.0 | |
| Arochlor [3] | | | | 2.0 |

[1] Two moles sulfur to one mole ZnO; the amount used was stoichiometric plus 10%.
[2] 50–50 mixture DMP-10 (dimethylaminomethyl phenol) and monoethanol amine.
[3] Added as plasticizer because the viscosity of the uncured polymer was too high to get good mixing without it.

The sample containing no polybutadiene exhibited a considerable amount of cold flow, which is typical of uncross-linked polymers. The other three samples showed no tendency to cold flow. These latter three samples had good elastomeric properties, and appear to have considerable value as calking and sealing compounds.

Reasonable variation and modification are permissible within the scope of this disclosure and the appended claim to our invention, the essence of which is that a cycloaliphatic dimercaptan is reacted with a diolefin in the presence of an organic peroxide or an azo nitrile catalyst.

We claim:

1. A process for producing a thiol-terminated polymer having a substantially constant molecular weight and a desired viscosity comprising:
   (a) contacting (1) a molar excess of β-mercaptoethyl cyclohexane thiol with (2) a mixture of 4-vinylcyclohexene-1 and 1,7-octadiene,
   (b) in the presence of a catalyst selected from organic peroxides and azo nitriles, and
   (c) at a temperature in the range of 120–350° F. to produce said thiol-terminated polymer.

References Cited

UNITED STATES PATENTS

| 2,347,182 | 4/1944 | Coffman | 260—79 |
| 3,030,344 | 4/1962 | Argabright et al. | 260—79 |
| 3,338,810 | 8/1967 | Warner | 204—159.14 |
| 3,374,206 | 3/1968 | Gourdon | 260—73 |
| 3,403,187 | 9/1968 | Oswald et al. | 260—79 |

JAMES A. SEIDLECK, Primary Examiner

U.S. Cl. X.R.

260—79.5